US006673477B2

(12) United States Patent
Yamazaki et al.

(10) Patent No.: US 6,673,477 B2
(45) Date of Patent: Jan. 6, 2004

(54) MAGNETIC RECORDING MEDIUM WITH A SPECIFIC RELATIVE SPEED TO A MAGNETIC HEAD

(75) Inventors: Nobuo Yamazaki, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 132 days.

(21) Appl. No.: 10/037,220

(22) Filed: Nov. 9, 2001

(65) Prior Publication Data

US 2002/0119345 A1 Aug. 29, 2002

(30) Foreign Application Priority Data

Nov. 10, 2000 (JP) ...................................... P.2000-343945

(51) Int. Cl.⁷ .................................................. B32B 5/16
(52) U.S. Cl. ................ 428/694 BN; 428/336; 428/694 BR
(58) Field of Search ................... 428/694 BN, 694 SG, 428/694 BR, 336

(56) References Cited

U.S. PATENT DOCUMENTS

| 5,796,539 | A | * | 8/1998 | Goda et al. |
| 5,908,683 | A | * | 6/1999 | Suzuki et al. |
| 5,922,454 | A | * | 7/1999 | Inaba et al. |
| 6,162,528 | A | * | 12/2000 | Ochi |
| 6,475,598 | B1 | * | 11/2002 | Naoe et al. |
| 6,529,342 | B1 | * | 3/2003 | Feng et al. |

* cited by examiner

*Primary Examiner*—H. Thi Le
(74) *Attorney, Agent, or Firm*—Stroock & Stroock & Lavan LLP

(57) ABSTRACT

A floppy disk-shaped magnetic recording medium of high recording density comprises a non-magnetic support provided on each side thereof sequentially with a substantially non-magnetic lower layer and a magnetic layer containing a ferromagnetic powder dispersed in a binder, and is used under a condition that a velocity of the medium relative to a magnetic head is at least 14 m/sec: wherein the non-magnetic lower layer has a thickness adjusted to be from five to twenty times as great as a maximum height of projections on the non-magnetic support surface, thereby achieving reduction in error rate increase.

8 Claims, No Drawings

MAGNETIC RECORDING MEDIUM WITH A SPECIFIC RELATIVE SPEED TO A MAGNETIC HEAD

FIELD OF INVENTION

The present invention relates to a particulate type magnetic recording medium for high-density recording, which has a magnetic layer where a ferromagnetic powder is dispersed in a binder. More specifically, the invention relates to a magnetic recording medium for high-density recording, which has on each side thereof a magnetic layer and a substantially non-magnetic lower layer, and contains in each outermost layer a fine powder of ferromagnetic metal or hexagonal ferrite.

BACKGROUND OF THE INVENTION

In the field of magnetic disks, 2MB of MF-2HD floppy disks using Cobalt-modified iron oxide have become standard with personal computers. In these days of upsurge in data volume to be processed, however, it can no longer be said that such a capacity is sufficient, but it is desirable to further enlarge the capacities of floppy disks.

In order to achieve increased recording capacity and miniaturization of recording media coupled with downsizing of computers and enhancement of computers' ability to process information in particular, expansion of recording capacity and improvement of data transfer speed are intensely required.

Hitherto, magnetic recording media which each comprise a non-magnetic support coated with a magnetic layer containing iron oxide, cobalt-modified iron oxide, $CrO_2$, a ferromagnetic metal powder or a hexagonal ferrite powder in a state of being dispersed in binder have been widely used. Of these magnetic substances, ferromagnetic metal powder and hexagonal ferrite powder are known to have excellent high-density recording characteristics.

In the case of disk-shaped magnetic recording media, the available large-capacity disks utilizing ferromagnetic metal powders excellent in high-density recording characteristics are 10 MB of MF-2TD and 21 MB of MF-2SD, and those utilizing hexagonal ferrite powders are 4MB of MF-2ED and 21 MB of Floptical. However, it can be said that the capacities and performances of these disks are no longer sufficient. Under these circumstances, many attempts to improve high-density recording characteristics have been made. Examples thereof are described below.

For improving characteristics of disk-shaped magnetic recording media, JP-A-64-84418 (the term "JP-A" as used herein means an "unexamined published Japanese patent application") proposes using vinyl chloride resin having acidic groups, epoxy groups and hydroxyl groups, JP-B-3-12374 (the term "JP-B" as used herein means an "examined Japanese patent publication") proposes using a fine powder of metal having Hc of at least 79,600 A/m (1,000 oersted (Oe)) and a specific surface area of 25 to 70 m²/g, and JP-B-6-28106 proposes specifying the specific surface area and the magnetization intensity of a magnetic powder and further incorporating abrasives.

For improving durability of a disk-shaped magnetic recording medium, JP-B-7-85304 proposes using an unsaturated fatty acid ester and an ether linkage-containing fatty acid ester, JP-B-7-70045 proposes using a branched fatty acid ester and an ether linkage-containing fatty acid ester, JP-A-54-124716 proposes incorporating non-magnetic powder having a Mohs' hardness of at least 6 and a higher fatty acid ester, JP-B-7-89407 discloses controlling the volume of pores taking in a lubricant to within the specified limits and the surface roughness to the range of 0.005 to 0.025 $\mu$m, JP-A-61-294637 discloses the use of fatty acid esters having low and high melting points, JP-B-7-36216 discloses the use of an abrasive having a grain size equal to from one-fourth to three-fourth the magnetic layer thickness and a fatty acid ester having a low melting point, and JP-A-3-203018 discloses the use of an Al-containing ferromagnetic metal and chromium oxide.

As to the structures of disk-shaped magnetic recording media having non-magnetic lower or intermediate layers, JP-A-3-120613 proposes the structure made up of a conductive layer and a magnetic layer containing a fine powder of metal, JP-A-6-290446 proposes the structure made up of a magnetic layer having a thickness of 1 $\mu$m or below and a non-magnetic layer, JP-A-62-159337 proposes the structure made up of a carbon interlayer and a magnetic layer containing a lubricant, JP-A-5-290358 proposes the structure having a non-magnetic layer in which carbon particles limited in size are incorporated, and JP-A-8-249649 proposes specifying an amount of the porosity in a lower coating layer and that in an upper magnetic layer and providing a reservoir for liquid lubricant.

On the other hand, disk-shaped magnetic recording media made up of thin-layer magnetic layers and functional non-magnetic layers have been developed in recent years, and 100 MB-class floppy disks have made their debut. As to magnetic disks having these features, JP-A-5-109061 proposes the magnetic disk constituted of a magnetic layer having Hc of at least 111,440 A/m (1,400 Oe) and a thickness of at most 0.5 $\mu$m and a non-magnetic layer containing conductive particles, JP-A-5-197946 proposes the magnetic disk having a constitution that the abrasive having a size greater than the magnetic layer thickness is incorporated, JP-A-5-290354 proposes the magnetic disk having a constitution that the magnetic layer has a thickness of no greater than 0.5 $\mu$m, variations in the magnetic layer thickness is controlled to within ±15% and the surface electric resistance is adjusted to the specified range, and JP-A-6-68453 proposes the magnetic disk having a constitution that two types of abrasives differing in grain size are incorporated and the total quantity of the abrasives at the surface are controlled to the specified range.

The reliability on magnetic disk performance, such as consistent writing and reading of data, under a condition that a magnetic disk is repeatedly used and running operations at a high speed are performed over great many times, is required more intensely than ever. For instance, JP-A-6-52541 discloses the magnetic recording medium containing as an abrasive at least one powder chosen from alumina, chromium oxide or diamond powder, and reports that the addition of such a highly hard powder has improved running stability. Further, large-capacity magnetic disks have increased linear recording density and track density, and enable a sharp decrease in area per one Bit of signal. Therefore, even minute defects on the disks come to be a fatal flaw in recording and reproducing signals.

The invention relates to a large-capacity floppy disk having improved high-density recording characteristics, and aims to provide a floppy disk having high durability and a reduced rate of error increase.

From our intensive studies to provide a magnetic recording medium having excellent electromagnetic conversion characteristics, satisfactory durability and an markedly improved error rate, especially in the high-density recording area, it has been noted that an error increase phenomenon occurred during repeated reproduction of recorded signals. By a close examination of a disk surface at which such errors occurred, it has been found that part of projections on the disk surface were shaved off by the use of a head slider and the shavings of magnetic layer adhered to other areas of the disk surface to cause defects. Further, by removal of the coating from the projections on the disk surface, it has been shown that a great part of the projections on the magnetic layer was ascribed to projections on the non-magnetic support.

More specifically, even when lower non-magnetic and upper magnetic layers provided on a non-magnetic support had a thickness several times greater than the height of projections on the non-magnetic support, the projections on the non-magnetic support formed protuberances from the magnetic layer surface. The projections on a non-magnetic support, such as a polyester film, have their source in aggregates of inorganic powder as filler, such as silica particles, and polymerization residues formed upon stretch of the polyester film.

Even the projections causing no problem in the case of using magnetic media at an ordinary number of revolutions come into high-speed collisions with a head slider; as a result, they are shaved off.

SUMMARY OF THE INVENTION

Therefore, an object of the invention is to eliminate such projections as to be shaved off by a head slider from the magnetic layer surface, thereby reducing errors in the repeated reproduction of recorded signals. This object is achieved by using any of the following magnetic recording media provided as embodiments of the invention.

1. A floppy disk-shaped magnetic recording medium which comprises a non-magnetic support provided on each side thereof sequentially with a substantially non-magnetic lower layer and a magnetic layer containing a ferromagnetic powder dispersed in a binder, and which is used under a condition that a velocity of the medium relative to a magnetic head is at least 14 m/sec: said non-magnetic lower layer having a thickness from five to twenty times as great as a maximum height of projections on the non-magnetic support surface.

2. A magnetic recording medium as described in embodiment 1, wherein the support is a film of polyester.

3. A magnetic recording medium as described in embodiment 2, wherein the polyester is polyethylene terephthalate.

When the velocity of a magnetic recording medium relative to a magnetic head is below 14 m/sec, the phenomenon in which projections are shaved off, or the issue that concerns the invention, occurs infrequently, and there is a slight increase in errors during repeated reproduction of recorded signals.

DETAILED DESCRIPTION OF THE INVENTION

The present magnetic recording medium is a floppy disk-shaped magnetic recording medium having a non-magnetic support and, on each side of the support, a substantially non-magnetic lower layer and a magnetic layer which is provided on the lower layer and comprises a ferromagnetic powder dispersed in a binder. Compositions of layers constituting the present magnetic recording medium, layer structures the present magnetic recording medium can have, and specific methods which can be adopted for producing the present magnetic recording medium are illustrated in succession.

Magnetic Layer

It is appropriate that the magnetic layer of the present magnetic recording medium have a coercive force (Hc) of at least 143.3 kA/m (1,800 oersted), preferably at least 159.2 kA/m (2,000 oersted), particularly preferably 183.1 to 278.6 kA/m (2,300 to 3,500 oersted). When the coercive force is smaller than 143.3 kA/m (1,800 oersted), it is difficult to achieve high recording density.

Ferromagnetic Powder

The ferromagnetic powders suitable for the present upper magnetic layer are ferromagnetic metal powders and hexagonal ferrite powders.

As the ferromagnetic metal powders, ferromagnetic alloy powders containing α-Fe as their main component are preferably employed.

Besides containing the atom specified above, these ferromagnetic metal powders may contain Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr or/and B atoms. In particular, it is advantageous to use a ferromagnetic metal powder containing not only α-Fe but also at least one atom selected from the group consisting of Al, Si, Ca, Y, Ba, La, Nd, Sm, Co, Ni and B, preferably from the group consisting of Co, Y, Al, Nd and Sm.

The suitable content of Co is from 0 to 40 atomic %, preferably from 15 to 35 atomic %, particularly preferably from 20 to 35 atomic %, based on the Fe.

The suitable content of Y is from 1.5 to 12 atomic %, preferably from 3 to 10 atomic %, particularly preferably from 4 to 9 atomic %, based on the Fe.

The suitable content of Al is from 1.5 to 30 atomic %, preferably from 5 to 20 atomic %, particularly preferably from 8 to 15 atomic %, based on the Fe.

Prior to dispersion, those ferromagnetic metal powders may be treated with a dispersing agent, a lubricant, a surfactant or/and an anti-static agent as described below. For instance, these treatments are described in JP-A-44-14090, JP-A-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-A-39-10307, JP-B-46-39639, and U.S. Pat. Nos. 3,026,215, 3,031, 341, 3,100,194, 3,242,005 and 3,389,014.

The ferromagnetic metal powders may contain a small amount of hydroxides or oxides.

The ferromagnetic metal powders usable in the invention are those obtained by known production methods. The following are production methods the invention can adopt:

1) A method of reducing a compound organic acid salt (mainly an oxalate) with a reducing gas, such as hydrogen, 2) A method of producing particulate Fe or Fe—Co via reduction of iron oxide with a reducing gas, such as hydrogen, 3) A method of thermally decomposing a metal carbonyl compound, 4) A method of adding a reducing agent, such as sodium borohydride, a hydrophosphite or hydrazine, to a water solution of ferromagnetic metals, and 5) A method of evaporating a metal in an inert gas atmosphere of low pressure, thereby pulverizing the metal.

The ferromagnetic metal powders produced by the methods as described above may be subjected to any of slow oxidation treatments, including a method of drying the powders after immersion in an organic solvent, a method of immersing the powders in an organic solvent and thereinto blowing an oxygen-containing gas to form an oxide layer on the particle surface and further drying the particles, and a method of forming an oxide layer on the particle surface by controlling pressure shares of oxygen gas and inert gas without using any organic solvent.

As to the specific surface area measured by BET method ($S_{BET}$), the ferromagnetic powder contained in the present magnetic layer generally has its $S_{BET}$ value in the range of 45 to 80 m$^2$/g, preferably in the range of 50 to 70 m$^2$/g. It is undesirable for the ferromagnetic powder to have its $S_{BET}$ value outside the foregoing range, because $S_{BET}$ values smaller than 45 m$^2$/g cause a noise increase and those greater than 80 m$^2$/g make it difficult to attain satisfactory surface properties.

The crystallite size of the ferromagnetic metal powder is generally from 80 to 180 Å, preferably from 100 to 180 Å, particularly preferably from 110 to 175 Å.

The suitable average particle length of the ferromagnetic metal powder is from 30 to 150 nm, preferably from 30 to 100 nm.

The suitable aspect ratio of the ferromagnetic metal powder is from 3 to 15, preferably from 5 to 12.

The saturation magnetization ($\sigma s$) of the ferromagnetic powder is generally from 100 to 200 A·m$^2$/kg (emu/g), preferably from 120 to 180 A·m$^2$/kg (emu/g).

It is appropriate that the ferromagnetic powder have its water content in the range of 0.01 to 2.0 weight %. The water content in the ferromagnetic metal powder is preferably optimized depending on the kind of the binder used together. Further, it is advantageous that the pH of the ferromagnetic powder be optimized depending on the combination with the binder used. The optimal pH range is generally from 4 to 12, preferably from 6 to 10.

The ferromagnetic powder may receive surface treatment with Al, Si, P or an oxide of such an element, if desired. The proportion of such an element or its oxide to the ferromagnetic powder used for the surface treatment is generally from 0.1 to 10 weight %. This surface treatment can produce a desirable effect that the adsorption of a lubricant, such as fatty acids, can be controlled to 100 mg/m$^2$ or below.

Cases are met with that the ferromagnetic powder used contains inorganic soluble ions, such as Na, Ca, Fe, Ni and Sr ions. Although it is preferable that the ferromagnetic powder be substantially free of such ions, they have little effect on characteristics of the magnetic layer so far as their content is 200 ppm or below.

Further, it is more advantageous to use a ferromagnetic powder having fewer pores. The suitable proportion of pores is 20 volume % or below, preferably 5 volume % or below. In addition, the ferromagnetic metal powder used in the invention may have any of acicular, rice-grain and spindle shapes as far as it meets the foregoing particle size requirements.

When the ferromagnetic powder itself has smaller SFD (switching field distribution), it can yield the better results. The appropriate value of SFD is 0.8 or below. In other words, it is preferable that the Hc distribution of ferromagnetic powder be made narrow. The SFD values below 0.8 are suitable for high-density digital magnetic recording, because they can ensure satisfactory electromagnetic conversion characteristics, high output, sharp magnetization flip and reduced peak shift. In the case of ferromagnetic metal powders, the narrow distribution of Hc can be attained by making a size distribution of geothite narrow or selecting a condition to retard sintering of geothite.

Carbon Black

The magnetic layer can contain carbon black, if desired. The carbon black usable in the magnetic layer includes furnace black for rubber use, thermal black for rubber use, carbon black for color, electrically conductive carbon black, and acetylene black.

It is appropriate that the carbon black used in the magnetic layer have its specific surface area in the range of 5 to 500 m$^2$/g, its DBP absorptive capacity in the range of 10 to 400 ml/100 g, its average particle size in the range of 5 to 300 nm, its pH in the range of 2 to 10, its water content in the range of 0.1 to 10 weight % and its tap density in the range of 0.1 to 1 g/cc.

Examples of commercially available carbon black include BLACKPEARLS 2000, 1300, 1000, 900, 905, 800 and 700 VULCAN XC-72 produced by Cabot Co., #80, #60, #55, #50 and #35 produced by Asahi Carbon Co., Ltd., #2400B, #2300, #90 #30, #40 and #10B produced by Mitsubishi Chemical Industries Ltd., CONDUCTEX SC, RAVEN 150, 50, 400, 15, and RAVEN-MT-P produced by Colombia Carbon Co., and KETJENBLACK EC produced by Akuzo Co., Ltd.

In advance of its use, carbon black may be surface-treated with a dispersing agent, a resin may be grafted onto carbon black, or carbon black surface may be partly converted into graphite.

The carbon black preferred in particular is carbon black treated with at least one anionic surfactant selected from amine salts of carboxylic acids or amine salts of phosphoric acid esters and having an average particle size of 5 to 100 nm, as is the case with carbon black contained in a non-magnetic layer.

On the other hand, carbon black may be dispersed into a binder before it is added to a magnetic coating composition. The carbon black powders as recited above can be used alone or as combinations.

When carbon black is mixed in the magnetic layer, the suitable proportion of carbon black to a ferromagnetic powder is from 0.1 to 30 weight %. The carbon black mixed in the magnetic layer has functions of preventing electrification, reducing a friction coefficient, screening out light and increasing the film strength. Which function the carbon black performs depends on the nature of the carbon black used. Therefore, the kinds, amounts and combinations of carbon black products may be different between the upper magnetic layer and the lower layer. Of course, it is possible to choose different carbon black products for the magnetic layer and the lower layer on the basis of the foregoing properties, such as the particle size, oil absorption, electric conductivity and pH, so as to suite respective purposes of these layers. If anything, it is required to choose carbon black products so as to optimize the foregoing properties in each layer. Details of various types of carbon black usable in the present magnetic layer can refer to, e.g., *Carbon Black Binran* (which may be translated by the English title "*Handbook of Carbon Black*"), compiled by Carbon Black Association.

Abrasives

An abrasive usable in the magnetic layer is comprised mainly of one or more of known materials having Mohs' hardness of at least 6, such as aluminum oxide having an α-alumina content of at least 90%, β-alumina, diamond, silicon carbide, chromium oxide, cerium oxide, α-iron oxide, corundum, silicon nitride, titanium carbide, titanium dioxide, silicon dioxide and boron nitride. Further, these abrasives may be used in the form of complex (obtained by treating the surface of one abrasive with another abrasive).

Although those abrasives sometimes contain compounds or elements other than their main components, they can function as abrasives as far as the proportion of their respective main components is greater than 90 weight %. The suitable average particle size of those abrasives is from 0.01 to 1 μm. In order to enhance electromagnetic conversion characteristics in particular, it is advantageous that those abrasives have narrow particle size distributions. For elevation of durability, on the other hand, abrasives having different particle sizes are combined as required, or abrasives may be used individually as far as their particle size distributions are broad.

It is advantageous that the abrasives used in the magnetic layer have their tap density in the range of 0.3 to 1.5 g/cc, their water content in the range of 0.1 to 5 weight %, their pH in the range of 2 to 11 and their specific surface area in the range of 1 to 40 m²/g.

The abrasives may have any of acicular, spherical and cubic shapes. However, shapes sharpened in parts are advantageous from the viewpoint of abrasive capability.

Examples of commercially available abrasives include AKP-10, AKP-15, AKP-20, AKP-30, AKP-50, HIT-20, HIT-30, HIT-50, HIT-60, HIT-50G, HIT-70, HIT-80, HIT-82 and HIT-100, which are products of Sumitomo Chemical Co., Ltd.; ERC-DBM, HP-DBM and HPS-DBM, which are products of Reynolds Co.; WA10000, a product of Fujimi Corporation.; UB20, a product of Uemura Kogyo & Co., Ltd.; G-5, Kuromex U2 and Kuromex U1, products of Nippon Chemical Industrial Co., Ltd.; TF100 and TF140, products of Toda Kogyo Corp.; Beta Random Ultrafine, a product of Ibiden Co. Ltd.; and B-3, a product of Showa Mining Co., Ltd.

These abrasives can be also added to the lower layer, if desired. By adding abrasives to the lower layer, the surface profiling can be controlled, or protuberances of abrasives from the surface can be controlled. Needless to say, optimum values are selected for the sizes and the amounts of abrasive particles used in the magnetic layer and added to the lower layer.

Non-magnetic Support

The support used for the present magnetic disk is non-magnetic. Examples of a non-magnetic support include known films made from polyesters, such as polyethylene terephthalate and polyethylene naphthalate, polyolefins, cellulose triacetate, polycarbonate, polyamides (including aliphatic polyamides and aromatic polyamides such as aramide), polyimides, polyamideimides, polysulfone and polybenzoxazole. Of these films, films having high strength, such as polyethylene naphthalate and polyamide films, are preferred as the support. If necessary, the multilayer support as disclosed in JP-A-3-224127 can also be used. These support materials may undergo in advance corona discharge, plasma treatment, adhesion-increasing treatment, heat treatment and dust cleaning treatment.

As the support of the present magnetic disk, it is advantageous to use a support material having a center-plane average surface roughness (Ra) of at most 8.0 nm, preferably at most 4.0 nm, particularly preferably at most 3.0 nm, as measured with a surface roughness profilometer according to MIRAU method, e.g., a roughness profilometer Model TOPO-3D made by WYKO Co. It is more advantageous that the support has not only small center-plane average surface roughness but also no coarse projections standing at least 0.5 μm high. Further, the surface roughness profile can be controlled freely by choosing the size and amount of filler added to the support as required. Examples of such fillers include oxides or carbonates of Ca, Si and T and organic fine powders, such as particulate acrylic resin.

As to the surface roughness characteristics of the support, it is appropriate that the support have a maximum height of projections: SRmax of at most 1 μm, a ten-point average roughness SRz of at most 0.5 μm, a center-plane peak height SRp of at most 0.5 μm, a center-plane valley depth SRv of at most 0.5 μm, a center-plane area rate SSr of 10 to 90% and an average wavelength Sλa of 5 to 300 μm.

In order to achieve the desired electromagnetic conversion characteristics and durability, the distribution of projections on the support surface can be controlled arbitrarily by use of fillers, and the number of projections having their sizes in the range of 0.01 to 1 μm can be controlled within the range of 0 to 2,000 per 0.1 mm².

The suitable F-5 value of a support used for the present magnetic disk is from 49 to 490 MPa (5 to 50 kg/mm²). The suitable thermal shrinkage ratio of the support is 3% or below, preferably 1.5% or below, under heating at 100° C. for 30 minutes, while that is 1% or below, preferably 0.5% or below, under heating at 80° C. for 30 minutes. Further, it is appropriate that the support endure a stress of 49 to 980 MPa (5 to 100 kg/mm²) before it breaks and have an elasticity coefficient of 980 to 19600 MPa (100 to 2000 kg/mm²). In addition, it is favorable that the temperature expansion coefficient be from $10^{-4}$ to $10^{-8}/20$ C., preferably from $10^{-5}$ to $10^{-6}/°$ C., and the humidity expansion coefficient be at most $10^{-4}$/RH %, preferably 1 at most $10^{-5}$/ RH %. Moreover, it is advantageous that these thermal characteristics, dimensional characteristics and mechanical strength characteristics be almost uniform in all in-plane directions with tolerances of 10%.

The suitable thickness of the support is from 10 to 100 μm, preferably from 20 to 80 μm.

As to the heights of projections on the support surface, the smaller the better.

The maximum projection height depends on the kind and the production method of a support used. In the case where the support used is a polyethylene terephthalate film, the maximum projection height is generally 500 nm or below, preferably 200 nm or below, particularly preferably 100 nm or below.

In the invention, the heights of projections on the support surface are represented by a maximum projection height, and the height of maximum projections on the surface of a disk support in the measurement with a roughness profilometer WYKO HD2000 is adopted as the maximum projection height.

Non-magnetic Lower Layer

In the next place, the lower layer is illustrated below in detail.

The lower layer of the present magnetic disk has no particular restrictions on its constitution so far as it exhibits no magnetism in a substantial sense. In general, however, the lower layer comprises at least a resin. And it is preferable to disperse powder, e.g., an inorganic or organic powder, into the resin.

Such an inorganic powder is generally non-magnetic, but a magnetic powder may be used so far as it is used to an extent that the lower layer is kept non-magnetic in a substantial sense. The expression "the lower layer is non-magnetic in a substantial sense" means that the lower layer is allowed to have magnetism to an extent of causing substantially no deterioration in electromagnetic conversion characteristics of the upper layer. Specifically, such an extent of magnetism is comparable to the case where the lower layer has residual magnetic flux density of no higher than 0.01 tesla (100 gauss (G)) or coercive force of no greater than 7.96 kA/m (100 oersted).

Non-magnetic Powder

The non-magnetic powder can be selected from inorganic compounds, such as metal oxides, metal carbonates, metal sulfates, metal nitrides, metal carbides or metal sulfides.

As the inorganic compound, aluminum oxide having an a-alumina content of at least 90%, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide can be used alone or as combinations of two or more thereof. Of these inorganic compounds, titanium dioxide, zinc oxide, iron oxide and barium sulfate are used to advantage because these compounds have narrow particle size distributions and many means to impart functions. In particular, it is effective to use titanium oxide and α-iron oxide It is appropriate that those non-magnetic powders have an average particle size of 0.005 to 0.3 μm. However, if desired, the average particle size may fall within such a range by the combined use of non-magnetic powders differing in particle size or independent use of a non-magnetic powder having a broad particle size distribution. In particular, non-magnetic powders having their average particle sizes in the range of 0.01 to 0.2 μm are preferable over the others. When the non-magnetic powder is granular metal oxide, the suitable average diameter thereof is from 0.01 to 0.08 μm; while, in the case of acicular metal oxide, the suitable average length is from 0.01 to 0.3 μm, preferably from 0.01 to 0.2 μm. The tap density of non-magnetic powder is generally from 0.05 to 2 g/ml, preferably from 0.2 to 1.5 g/ml. The water content of non-magnetic powder is generally in the range of 0.1 to 5 weight %, preferably 0.2 to 3 weight %, particularly preferably 0.3 to 1.5 weight %. The pH of non-magnetic powder is generally in the range of 2 to 11, but the pH range of 3 to 10 is preferred in particular.

The specific surface area of non-magnetic powder is generally from 1 to 100 m$^2$/g, preferably from 5 to 80 m$^2$/g, and particularly preferably from 10 to 70 m$^2$/g. The suitable crystallite size of non-magnetic powder is from 0.004 to 0.3 μm, preferably 0.04 to 0.1 μm. The oil absorptive capacity using dibutyl phthalate (DBP) is in the range of generally 5 to 100 ml/100 g, preferably 10 to 80 ml/100 g, particularly preferably 20 to 60 ml/100 g. The specific gravity is generally from 1 to 12, preferably from 3 to 6. The shape of non-magnetic powder may be any of acicular, spherical, polyhedral and tabular shapes. The suitable Mohs' hardness of non-magnetic powder is from 4 to 10. The amount of stearic acid adsorbed to non-magnetic powder is in the range of generally 1 to 20 μmol/m$^2$, preferably 2 to 15 μmol/m$^2$, particularly preferably 3 to 8 μmol/m$^2$.

It is advantageous that the non-magnetic powders as recited above undergo surface treatment for causing $Al_2O_3$, $SiO_2$, $TiO_2$, $ZrO_2$, $SnO_2$, $Sb_2O_3$, ZnO or $Y_2O_3$ to be present on the powder surface. Of these oxides, $Al_2O_3$, $SiO_2$, $TiO_2$ and $ZrO_2$, especially $Al_2O_3$, $SiO_2$ and $ZrO_2$, are preferred over the others from the viewpoint of dispersibility. Those oxides may be used in combination or independently.

Such a surface treatment layer may be formed by co-precipitation of oxides, if desired, or by providing an alumina layer first and then silica layer, or vise versa. In addition, the surface treatment layer formed may be porous depending on the intended purposes, but it is generally appropriate that the layer be uniform and dense.

Examples of non-magnetic powder usable for the present lower layer include Nanotite produced by Showa Denko K. K., HIT-100 and ZA-G1 produced by Sumitomo Chemical Co., Ltd., α-hematite DPN-250, DPN-250BX, DPN-245, DPN-270BX, DPN-500BX, DBN-SA1 and DBN-SA3 produced by Toda Kogyo Corp., titanium dioxide TTO-51B, TTO-55A, TTO-55B, TTO-55C, TTO-55S, TTO-55D and SN-100 produced by Ishihara Sangyo, α-hematite E270, E271, E300 and E303 produced by Ishihara Sangyo, titanium dioxide STT-4D, STT-30D, STT-30 and STT-65C produced by Titan Kogyo, α-hematite α-40 produced by Titan Kogyo, MT-100S, MT-100T, MT-150W, MT-500B, MT-600B, MT-100F and MT-500HD produced by TAYKA Corporation, FINEX-25, BF-1, BF-10, BF-20 and ST-M produced by Sakai Chemical Industry Co., Ltd., DEFIC-Y and DEFIC-R produced by Dowa Mining Co., Ltd., AS2BM and TiO2P25 produced by Nippon Aerosil Corporated, 100A and 500A produced by Ube Industries Ltd., and burned substances thereof. Of these products, titanium dioxide and α-iron oxide products are preferred in particular.

Carbon Black Mixed in Lower Layer

By mixing carbon black in the lower layer, known effects can be imparted to the lower layer. For instance, the surface electric resistance (Rs) can be lowered, the light transmittance can be reduced, and the desired micro Vickers hardness can be attained. In addition, the carbon black contained in the lower layer can produce a lubricant storage effect. As to the kinds of carbon black capable of producing such effects, furnace black for rubber use, thermal black for rubber use, carbon black for color and acetylene black are usable. It is appropriate to select the kind of carbon black so that the characteristics as mentioned below are optimized depending on the desired effects. In some cases, greater effects can be achieved by combined use of different kinds of carbon black.

The carbon black used in the lower layer generally has its specific surface area in the range of 100 to 500 m$^2$/g, preferably 150 to 400 m$^2$/g, and its DBP absorptive capacity in the range of 20 to 400 ml/100 g, preferably 30 to 400 m/100 g. The average particle size of the carbon black used is from 5 to 80 nm, preferably from 10 to 50 nm, particularly preferably from 10 to 40 nm. Further, it is appropriate that the pH, water content and tap density of the carbon black used be from 2 to 10, from 0.1 to 10 weight % and from 0.1 to 1 g/ml, respectively.

Examples of carbon black usable in the lower layer include BLACKPEARLS 2000, 1300, 1000, 900, 800, 880 and 700, and VULCAN XC-72 produced by Cabot Co., #3050B, #3150B, #3250B, #3750B, #3950B, #950, #650B, #970B, #850B MA-600, MA-230, #4000 and #4010 produced by Mitsubishi Chemical Industries Ltd., CONDUCTEX SC, RAVEN 8800, 8000, 7000, 5750, 5250, 3500, 2100, 2000, 1800, 1500, 1255 and 1250 produced by Colombia Carbon Co., and KETJENBLACK EC produced by Akuzo Co.

In advance of its use, carbon black may be surface-treated with a dispersing agent, a resin may be grafted onto carbon black, or carbon black surface may be partly converted into graphite. On the other hand, carbon black may be dispersed into a binder before it is added to a coating composition.

The thus pre-treated carbon black can be used in a proportion lower than 50 weight % to the inorganic compound powder as recited above, and that lower than 40 weight % to the total weight of non-magnetic layer. The carbon black of various kinds as recited above may be used alone or as combinations. Details of various kinds of carbon black usable in the present invention can refer to, e.g., *Carbon Black Binran* (which may be translated by the English title "*Handbook of Carbon Black*"), compiled by Carbon Black Association.

To the lower layer, organic powders can also be added depending on the intended purposes. Examples of an organic powder which can be added include acrylic-styrene resin powder, benzoguanamine resin powder, melamine resin powder and phthalocyanine pigments. Further, polyolefin resin powder, polyester resin powder, polyamide resin powder, polyimide resin powder and polyfluoroethylene resin powder may be used. For production of those organic powders, the methods described in JP-A-62-18564 and JP-A-60-255827 can be adopted.

Binders

To selecting the kinds and the amounts of binders used in the magnetic layer and the lower layer of the present magnetic disk, hitherto known arts can be applied.

The binders used in the invention may be any of resins hitherto used as binders, including known thermoplastic resins, thermosetting resins, reactive resins, radiation-curable resins and mixtures thereof.

As to the thermoplastic resins usable as binders, their glass transition temperatures are generally within the range of −100 to 150° C., their number average molecular weights (measured by GPC and calculated in terms of polystyrene) are generally within the range of 1,000 to 200,000, preferably 10,000 to 100,000, and their polymerization degrees are generally about 50 to 1,000.

Examples of such thermoplastic resins include homopolymers and copolymers containing constituent units derived from monomers such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether, polyurethane resin and various resins of rubber type.

And examples of thermosetting resins or reactive resins include phenol resin, epoxy resin, polyurethane resin of cure type, urea resin, melamine resin, alkyd resin, acrylic reactive resin, formaldehyde resin, silicone resin, epoxy-polyamide resin, a mixture of polyester resin and isocyanate prepolymer, a mixture of polyesterpolyol and polyisocyanate, and a mixture of polyurethane and polyisocyanate.

Examples of radiation-curable resins are described in Japanese Patent Application 2000-305161, and the description therein can be referred to.

Details of those resins are described, e.g., in *Plastics Handbook*, published by Asakura Shoten.

In addition, it is possible to use known electron beam-curable resins in each layer. Detailed explanation of such resins and manufacturing methods thereof can be found in JP-A-62-256219.

The resins as recited above can be used alone or as a combination of two or more thereof. As suitable examples of a resin combination, mention may be made of a combination of polyurethane resin and at least one resin selected from the groups consisting of vinyl chloride resin, vinyl chloride-vinyl acetate copolymer, vinyl chloride-vinyl acetate-vinyl alcohol copolymer and vinyl chloride-vinyl acetate-maleic anhydride copolymer, and a combination of the foregoing combination and polyisocyanate.

As the makeup of the polyurethane resin, known ones including polyesterpolyurethane, polyetherpolyurethane, polyetherpolyesterpolyurethane, polycarbonatepolyurethane, polyesterpolycarbonatepolyurethane and polycaprolactone-polyurethane can be adopted.

For enhancing dispersibility and durability of all the binders recited above, it is desirable that at least one polar group selected from —COOM, —SO$_3$M, —OSO$_3$M, —P=O(OM)$_2$, —O—P=O(OM)$_2$ (wherein M is a hydrogen atom or an alkali metal), —OH, —NR$_2$, —N$^+$R$_3$ (wherein R is a hydrocarbon group), epoxy group, —SH or —CN be introduced into each binder by copolymerization or addition reaction on an as needed basis.

The suitable content of such polar groups in each binder is from $10^{-1}$ to $10^{-8}$ mole/g, preferably from $10^{-2}$ to $10^{-6}$ mole/g.

Examples of those binders usable in the invention include VAGH, VYHH, VMCH, VAGF, VAGD, VROH, VYES, VYNC, VMCC, XYHL, XYSG, PKHH, PKHJ, PKHC and PKFE produced by Union Carbide Co., MPR-TA, MPR-TA5, MPR-TAL, MPR-TSN, MPR-TMF, MPR-TS, MPR-TM and MPR-TAO produced by Nissin Chemical Industry Co., Ltd., 1000W, DX80, DX81, DX82, DX83 and 100FD produced by Electro Chemical Industry Co., Ltd., MR-104, MR-105, MR 110, MR100, MR555 and 400X-110A produced by ZEON CORP., Nipporan N2301, N2302 and N2304 produced by Nippon Polyurethane Industry Co., Ltd., Pandex T-5105, T-R3080 and T-5201, Bamoc D-400 and D-210-80, and Crysbon 6109 and 7209 produced by Dainippon Ink & Chemicals, Inc., Vylon UR8200, UR8300, UR-8700, RV530 and RV280 produced by Toyobo Co., Daiferamine 4020, 5020, 5100, 5300, 9020, 9022 and 7020 produced by Dainichiseika C. & C. Mfg., MX5004 produced by Mitsubishi Chemical Industries Ltd., Sanprene SP-150 produced by Sanyo Chemical Industries Co., Ltd., and Saran F310 and F210 produced by Asahi Chemical Industry Co., Ltd.

In the present magnetic disk, such binders are used in a proportion of generally 5 to 50 weight %, preferably 10 to 30 weight %, to non-magnetic powder in the lower layer, and to ferromagnetic metal powder in the magnetic layer.

More specifically, when vinyl chloride resin is used as binder, the suitable proportion thereof is in the range of 5 to 30 weight %, when polyurethane resin is used as binder, the suitable proportion thereof is in the range of 2 to 20 weight %, and when polyisocyanate is used, the suitable proportion thereof is in the range of 2 to 20 weight %. The combined use of those resins are advantageous. However, it is possible to use polyurethane alone or a combination of polyurethane with polyisocyanate alone in the case where a slight amount of chlorine evolved by dechlorination causes head corrosion.

When polyurethane is used as a binder in the invention, it is appropriate that the polyurethane have a glass transition temperature of −50 to 150° C., preferably 0 to 100° C., endure an elongation of 100 to 2,000% and a stress of 0.49 to 98 MPa (0.05 to 10 kg/mm$^2$) before it breaks, and have a yield point of 0.49 to 98 MPa (0.05 to 10 Kg/mm$^2$).

The present magnetic disk is basically constructed of an lower layer and a magnetic layer, but the lower layer and/or the magnetic layer may have two or more constituent layers. Therefore, needless to say, it is possible to vary the binder content, the proportions of vinyl chloride resin, polyurethane resin, polyisocyanate and other resins in the binder, or the molecular weight and polar group content of each of resins forming the magnetic layer, or physical characteristics of the resins as mentioned above from one constituent layer to another, if needed. If anything, it is better to optimize those factors on a constituent layer basis. In this case, known arts of multilayer structure are applicable. In the case of varying the binder content from one constituent layer to another, for instance, an increase of a binder content in the magnetic layer enables reduction of abrasion at the magnetic layer surface, and that in the lower layer can render the lower layer flexible and improve the touch of a head on the magnetic disk. In applying known arts, it goes without saying that optimizations are performed within a range that the present effects can be achieved.

Examples of polyisocyanate usable in the invention include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates.

Commercially available products of the isocyanates as recited above are, e.g., Colonate L, Colonate HL, Colonate 2030, Colonate 2031, Millionate MR and Millionate MTL (trade names, produced by Nippon Polyurethane Industry Co., Ltd.), Takenate D-102, Takenate D-110N, Takenate D-200 and Takenate D-202 (trade names, produced by Takeda Chemical Industries, Ltd.), and Desmodur L, Desmodur IL, Desmodur N and Desmodur HL (trade names, produced by Sumitomo Bayer Co., Ltd.). In each layer, these products may be used alone or as a combination made of at least two products utilizing a difference in curing reactivity.

It is desirable for the thickness of the non-magnetic lower layer to be from 5 times (preferably at least 7 times) to 20 times (preferably 15 times, particularly preferably 10 times) as great as a maximum height of projections on the support. Although it depends on the heights of projections on the support, the thickness of the lower layer is generally from 0.1 to 5 $\mu$m, preferably from 0.2 to 3 $\mu$m, particularly preferably from 0.2 to 2.0 $\mu$m.

With respect to the relation between the height of maximum projections on the support surface and the thickness of the lower layer, the rate of increase in errors becomes low when the ratio of the thickness of the lower layer to the height of maximum projections on the support is 5 or greater; while the rate becomes high when the ratio is smaller than 5. And the thicker the non-magnetic lower layer, the lower the rate of increase in errors. However, the lower layer rendered too thick causes deterioration in durability instead. It can be thought that the deterioration in durability is due to the influence of the soft non-magnetic lower layer gaining dominance over the magnetic layer.

Additionally, the lower layer can achieve its effect as far as it is substantially non-magnetic. Even when the lower layer contains magnetic impurities or a slight amount of magnetic substance is added thereto intentionally, the effects intended by the invention can be produced. Therefore, as already mentioned, such layers are regarded as having substantially the same composition as the present lower layer. Specifically, those layers fall on the cases where the residual magnetic flux density is not higher than 0.01 tesla (100 gauss) or the coercive force is 7.96 kA/m (100 oersted) or below. However, layers having neither residual magnetic flux density nor coercive force are preferred.

Additives

Compounds having a lubricating effect, an anti-static effect, a dispersing effect or a plasticizing effect can be used as additives for a magnetic layer and an lower layer to constitute the present magnetic recording medium.

As examples of compounds usable as such additives, mention may be made of molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkyl phosphoric acid ester and alkali metal salts thereof, alkylsulfuric acid ester and alkali metal salts thereof, polyphenyl ether, phenylphosphonic acid, $\alpha$-natphthylphosphoric acid, phenylphosphoric acid, diphenylphosphoric acid, p-ethylbenzenephosphonic acid, phenylphosphinic acid, aminoquinone, various types of silane coupling agent, titanium coupling agent, fluorine-containing alkylsufliric acid ester and alkali metal salts thereof, monobasic fatty acid containing 10 to 24 carbon atoms (which may contain unsaturated bonds or branched chains) and metal salts of such a fatty acid (e.g., Li, Na, Ka and Cu salts), monohydric to hexahydric alcohol containing 12 to 22 carbon atoms (which may have unsaturated bonds or branched chains), alkoxyalcohol containing 12 to 22 carbon atoms (which may have unsaturated bonds or branched chains), mono-, di- or trifatty acid ester produced by reaction of 10–24C monobasic fatty acid (which may have unsaturated bonds or branched chains) with one kind of alcohol chosen from 2–12C monohydric to hexahydric alcohols (which may have unsaturated bonds or branched chains), fatty acid ester of polyalkylene oxide monoalkyl ether, fatty acid amide containing 8 to 22 carbon atoms, and aliphatic amine containing 8 to 22 carbon atoms.

More specifically, the foregoing fatty acid includes capric acid, caprylic acid, lauric acid, myristic acid, palmitic acid, stearic acid, behenic acid, oleic acid, elaidic acid, linolic acid, linolenic acid, and isostearic acid.

The foregoing ester includes butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl ester.

The foregoing alcohol includes oleyl alcohol, stearyl alcohol, and lauryl alcohol.

Further, nonionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acid groups such as carboxyl, sulfo, phospho, sulfate and phosphate groups, and amphoteric surfactants, such as amino acids, aminosulfonic acids, sulfuric or phosphoric acid esters of aminoalcohols, and alkyl betaine-type surfactants, can be used. Details of these surfactants are described in *Kaimen Kasseizai Binran* (which may be translated by the English title "*Handbook of Surfactants*"), published by Sangyo Tosho K. K. The lubricants and anti-static agents as recited above are not always required to be 100% pure, but may contain impurities, such as isomers, unreacted materials, by-products, decomposed matter and oxides. The allowable level of contamination with such impurities is below 30 weight %, preferably below 10 weight %.

Those lubricants and surfactants usable in the invention are each different in physical actions from every other one. So it is required that the types and amounts of surfactants and lubricants to be used and the proportion between lubricants capable of producing a synergistic effect be determined optimally depending on the intended purpose. For instance, it is thought that the oozing of fatty acids and esters from the layer surface is controlled by using fatty acids differing in melting point or esters differing in boiling point, melting points and polarity in the lower layer and the magnetic layer respectively, the coating stability is enhanced by controlling the amount of surfactants added, and the lubricating effect is elevated by adding a greater amount of lubricant to the lower layer. Needless to say, the cases mentioned above should not be construed as limiting the scope of the invention. In general the total proportion of lubricants can be chosen from the range of 0.1 to 50 weight %, preferably 2 to 25 weight %, to the ferromagnetic powder in the magnetic layer or the non-magnetic powder in the lower layer.

All or part of additives used in the invention maybe added in any of processes for preparing a magnetic or non-magnetic coating composition. For instance, there may be cases where the additives are mixed with a ferromagnetic powder prior to the kneading process, they are added during the process of kneading a ferromagnetic powder, a binder and a solvent, they are added in the process of dispersion, they are added after the dispersion process, and they are added just before coating. On the other hand, simultaneous or successive application of all or part of the additives to an already formed magnetic layer sometimes allows the desired purposes to be achieved. Further, in some cases, the magnetic layer surface may be coated with a lubricant after calendering (heating and pressing treatment with a calender roll) or slitting operation.

For preparing the coating compositions as mentioned above, known organic solvents are usable, with examples including the solvents described in JP-A-6-68453.

Layer Structure

The layer structure of the present magnetic recording medium is described below in detail.

Between the support and the lower layer, a subbing layer may be provided for the purpose of adhesion enhancement. The suitable thickness of the subbing layer is from 0.01 to 0.5 μm, preferably from 0.02 to 0.5 μm.

The magnetic layer thickness of the present magnetic recording medium is optimized depending on the saturation magnetization of a head used, the head gap length and the frequency band of recording signals. The suitable thickness of the magnetic layer is from 0.02 to 0.5 μm, preferably from 0.05 to 0.25 μm. The present magnetic layer may be divided into two or more layers differing in magnetic characteristics, and can be made up according to known constitutions for magnetic layers having a multilayer structure.

Method of Producing Magnetic Recording Medium

The method of producing the present magnetic recording medium comprises a process of preparing coating compositions for forming constituent layers respectively, a process of coating a support with the coating compositions, and processes of subjecting the coating layers to orientation, drying, cooling, calendering, after-curing and polishing treatments.

The process of preparing a magnetic coating composition or a lower layer composition for the present magnetic recording medium comprises at least kneading and dispersing steps and, if desired, mixing steps may be added before and after those steps. Each step may be parted into two or more stages.

All materials, inclusive of a ferromagnetic metal powder, a non-magnetic powder, a binder, carbon black, an abrasive and an anti-static agent, a lubricant and a solvent, may be added at the beginning or during the course of any of steps. Each material may be added in two or more portions at separate steps. For instance, it is allowable to divide polyurethane into three portions and charge them at a kneading step, a dispersing step and a mixing step for viscosity adjustment after dispersion, respectively.

In addition, hitherto known techniques for production may be applied to some steps. At the kneading step, it is advantageous to use a mighty kneading machine, such as an open kneader, a continuous kneader, a pressurized kneader or an extruder. The details of kneading treatment are described in JP-A-1-106338 and JP-A-1-79274.

In order to disperse coating compositions for the magnetic layer and the lower layer, glass beads may be used, but dispersing media greater in specific gravity, such as zirconia beads, titania beads and steel beads, are used to advantage. Therein, the dispersion medium having an optimized bead size is used at the most suitable charging rate. The dispersion can be performed with a known dispersing machine.

As a method of coating a support with coating compositions to form the present magnetic recording medium having a multilayer structure, the following methods are preferably adopted.

In a first method, an lower layer is formed on a support by means of a coating apparatus usually used in application of magnetic coating compositions, such as a gravure, roll, blade or extrusion coater and, while the lower layer is in a wet condition, an upper layer is coated thereon by the use of a pressurized support extrusion coater as disclosed in JP-B-1-46186, JP-A-60-238179 and JP-A-2-265672.

In a second method, an upper layer and a lower layer are coated almost simultaneously by the use of a coating head having two slits for passage of coating compositions as disclosed in JP-A-63-88080, JP-A-2-17971 and JP-A-2-265672.

In a third method, an upper layer and a lower layer are coated almost simultaneously by the use of a backup roll-attached extrusion coater as disclosed in JP-A-2-174965.

In addition, it is desirable to apply a sheering stress to the coating composition in the interior of a coating head by use of the method disclosed in JP-A-62-95174 or JP-A-1-236968 for then purpose of preventing electromagnetic conversion characteristics of the magnetic disk to be formed from degrading due to agglomeration of magnetic particles.

Further, it is appropriate that each coating composition have its viscosity in the numerical range disclosed in JP-A-3-8471.

It goes without saying that the layer structure of a magnetic recording medium relating to the invention can be achieved by adopting a successive multilayer coating method wherein after coating a lower layer and drying it, a magnetic layer is coated thereon, and no loss of the present effects is caused therein. However, it is preferable to adopt the aforementioned simultaneous multilayer coating method from the viewpoints of reduction in coating defects and improvement in dropout quality.

The present magnetic recording medium can sometimes have sufficiently isotropic orientation without using any orientation apparatus, but it is preferable to make the magnetic recording medium have isotropic orientation by the use of a known random orientation apparatus, e.g., an apparatus equipped with cobalt magnets aligned in a staggered format or an apparatus equipped with a solenoid for application of an alternating magnetic field. As to the isotropic orientation, in-plane two-dimensionally random orientations are generally preferable, but three-dimensionally random orientations with a vertically magnetized component are also appropriate. On the other hand, circumferential orientation may be provided by spin-coating.

In the foregoing coating step, it is appropriate that the drying position on the coating layer be controlled by properly adjusting the temperature and volume of drying air and the coating speed. Specifically, the coating speed may be chosen from the range of 20 to 1,000 m/min, and the suitable temperature of drying air is 60° C. or above. In addition, the coating layer may undergo appropriate pre-drying treatment before it enters into the orientation step.

As a roll for calendering, a heat-resistant plastic roll, such as a roll made from epoxy resin, polyimide, polyamide or polyimideamide, or a metal roll can be used. In the present case of providing a magnetic layer on both sides, it is desirable that the calendering be performed between two metal rolls. The suitable calender roll temperature is not lower than 50° C., preferably 100° C. or above, and the suitable linear pressure applied is at least 1960 N/cm (200 kg/cm), preferably at least 2940 N/cm (300 kg/cm).

After calendering treatment, the thus produced magnetic recording medium is stamped into disks, and each of these disks is encased in a cartridge provided with a liner on the inside. Further, the intended electromechanical components are attached to the cartridge, thereby producing a magnetic disk. In addition, after stamping the magnetic recording medium into disks, the disks may be subjected to after-treatment, such as thermal treatment at a high temperature (generally from 50 to 90° C.) to promote curing treatment of the coating layers, or burnish treatment with an abrasive tape to cut away protrusions from the disk surface, if needed.

Physical Characteristics

The ferromagnetic metal powder-containing magnetic layer of a magnetic recording medium relating to the invention has a saturated magnetic flux density of 0.2 to 0.6 tesla (2,000 to 6,000 gauss) under normal conditions. The saturated magnetization of a hexagonal ferrite-containing medium is generally from 0.08 to 0.3 tesla (800 to 3,000 gauss). With respect to the coercive force distribution therein, the narrower the better. The suitable values of SFD and SFDr are each 0.6 or below. Further, in an ordinary case, the magnetic layer has a squareness ratio of 0.45 to 0.55 when it is in a randomly oriented state, 0.6 to 0.67 when it is in a state of two-dimensionally random orientation, and at least 0.5 when it is in a vertically oriented state.

The suitable coefficient of the friction of the present magnetic recording medium with a head is at most 0.5, preferably at most 0.3, at a temperature ranging from −10° C. to 40° C. and a humidity ranging from 0% to 95%. The suitable specific resistance at the magnetic layer surface is from $10^4$ to $10^{12}$ Ω/sq, and the suitable electrification potential is within the range of −500 V to +500 V.

It is appropriate that the magnetic layer have an elasticity modulus of 980 to 19,600 PMa (100 to 2,000 kg/mm$^2$) under a 0.5% elongation in all in-plane directions, and a tensile strength of 98 to 686 PMa (10 to 70 Kg/mm$^2$) at break. On the other hand, it is advantageous that the magnetic disk has an elasticity modulus of 980 to 14,700 PMa (100 to 1,500 kg/mm$^2$) in all in-plane directions, a residual elongation of at most 0.5% and a thermal shrinkage of at most 1%, preferably at most 0.5%, particularly preferably at most 0.1%, at all of temperatures up to 100° C.

The suitable glass transition temperature of the magnetic layer (the maximum point of loss elasticity modulus in the kinetic viscoelasticity measurement made at 110 Hz) is from 50° C. to 120° C., and that of the lower layer is from 0° C. to 100° C.

The appropriate loss elasticity modulus is from $1\times10^3$ to $1\times10^4$ N/cm$^2$ ($1\times10^8$ to $8\times10^9$ dyne/cm$^2$), and the appropriate loss tangent is at most 0.2. When the loss tangent is too great, a tackiness trouble tends to occur. Preferably, these thermal characteristics and mechanical characteristics are almost uniform in all in-plane directions of the medium with tolerances of 10%. The appropriate content of a residual solvent in the magnetic layer is 100 mg/m$^2$ or below, preferably 10 mg/m$^2$ or below.

It is advantageous that the non-magnetic lower layer and the magnetic layer have both a porosity of 30 volume % or below, preferably 20 volume % or below. The smaller porosity is more favorable for achieving high output, but the porosity may be increased to an extent necessary for a certain particular purpose. For instance, in the case of repetition use-oriented disk media, it frequently occurs that the greater porosity is more favorable for ensuring running durability.

The Ra of the magnetic layer is from 1.0 to 7.0 nm, and it is appropriate for the magnetic layer to have a maximum height SRmax of at most 0.5 μm, a ten-point average roughness SRz of at most 0.3 μm, a center-plane peak height SRp of at most 0.3 μm, a center-plane valley depth SRv of at most 0.3 μm, a center-plane area rate SSr of 20 to 80% and an average wavelength Sλa of 5 to 300 μm. The number of projections on the magnetic layer surface, which measure 0.01 to 1 μm in size, can be arbitrarily adjusted to the range of 0 to 2,000, and by proper adjustment thereof optimizations of electromagnetic conversion characteristics and friction coefficient are performed to advantage. The surface features recited above can be attained with ease by controlling surface properties of the support by addition of filler and selecting the grain size and the amount of a powder added to the magnetic layer and the surface profile of rollers used for calendering. In addition, it is appropriate to control a curl to within ±3 mm.

In the present magnetic recording medium, the aforementioned physical characteristics of the lower layer and those of the magnetic layer can be independently selected depending on the intended purposes. For instance, high elasticity modulus is conferred on the magnetic layer to improve the running durability, and at the same time the elasticity modulus of the lower layer is rendered lower than that of the magnetic layer to ensure a desirable touch of a head on the magnetic recording medium.

Now, the invention will be illustrated in more detail by reference to the following examples, but these examples should not be construed as limiting the scope of the invention in any way. Additionally, all "parts" in the following examples are by weight unless otherwise noted.

Preparation of Coating Compositions

The following coating compositions were prepared.

1. Magnetic coating composition X:

| | |
|---|---|
| Fine powder of ferromagnetic metal | 100 parts |
| Composition: Fe 50%, Co 30%, Al 10%, Y 10% | |
| Hc: 167 kA/m (2,100 Oe), | |
| σs: 135 A · m$^2$ (emu/g) | |
| Vinyl chloride copolymer | 12 parts |
| (MR110, a product of ZEON CORP.) | |
| Polyurethane resin | 3 parts |
| (UR8200, a product of Toyobo Co.) | |
| α-Alumina | 5 parts |
| (HIT55, a product of Sumitomo Chemical Co., Ltd.) | |
| Carbon black | 5 parts |
| (#50, a product of Asahi Carbon Co., Ltd.) | |
| Phenylphosphonic acid | 3 parts |
| Particulate diamond | 1 parts |
| (0–⅙, a product of Tomei Diamond Co., Ltd.) | |
| Butyl stearate | 4 parts |
| Butoxyethyl stearate | 4 parts |
| Isohexadecyl stearate | 4 parts |
| Stearic acid | 2 parts |
| Methyl ethyl ketone | 180 parts |
| Cyclohexanone | 180 parts |

2. Non-magnetic coating composition:

| | |
|---|---|
| TiO$_2$ of rutile type as non-magnetic powder | 80 parts |
| Average primary grain size: 0.035 μm, | |
| Specific surface area measured by BET method: 40 m$^2$/g, | |
| pH: 7, TiO$_2$ content: at least 90%, | |
| DBP absorptive capacity: 27–38 g/100 g | |
| Al$_2$O$_3$ as surface treating agent: 8 weight % | |
| Carbon black | 20 parts |
| (CONDUCTEX SC-U, a product of Colombia Carbon Co.) | |
| Vinyl chloride copolymer | 12 parts |
| (MR110, a product of ZEON CORP.) | |
| Polyurethane resin | 5 parts |
| (UR8200, a product of Toyobo Co.) | |
| Phenylphosphonic acid | 4 parts |
| Butyl stearate | 3 parts |
| Butoxyethyl stearate | 3 parts |

-continued

| Isohexadecyl stearate | 3 parts |
|---|---|
| Stearic acid | 1 parts |
| 8:2 Mixture of methyl ethyl ketone and cyclohexanone | 250 parts |

3. Preparation of Coating Solutions

The ingredients to constitute each of the aforementioned coating compositions were kneaded with a kneader, and then dispersed with a sand mill. To each of the dispersions thus prepared was added a dispersion of α-alumina (HIT55, a product of Sumitomo Chemical Co., Ltd.) in a prescribed amount, if needed, and further was added polyisocyanate in an amount of 10 parts. Furthermore, 40 parts of cyclohexanone was added to each of the coating compositions. The resulting compositions were each passed through a filter having an average pore size of 1 μm, thereby preparing coating compositions for forming a lower layer and a magnetic layer respectively.

Method of Producing Sample Disks

By the use of a simultaneous coating technique, the non-magnetic layer coating composition and the magnetic layer coating composition prepared in the foregoing manners were coated at a coating speed of 150 m/min on a 62 μm-thick polyethylene terephthalate support having a center-plane average surface roughness of 3 nm so that the non-magnetic layer coated had a dry thickness as set forth in Table 1 and the magnetic layer coated had a dry thickness of 0.15 μm. While the layers coated were both in a wet condition, they were treated so as to have random orientations by passing them through an apparatus generating an alternate magnetic field having an intensity of 120 gauss and a frequency of 50 Hz, and then dried. Furthermore, the other surface of the support was subjected to coating, orientation, drying in the same manner as in the above. Then, the support having double layers for both sides was subjected to surface smoothening treatment using a 7-stage calender under conditions that the temperature was 90° C. and the linear pressure was 300 Kg/cm, and then stamped into disks measuring 3.7 inches in diameter (for ZIP drive evaluation), followed by surface polishing treatment. Furthermore, each disk was subjected to thermal treatment at 60° C. for 48 hours. Evaluation results of magnetic disk samples thus produced were shown in Table 1.

TABLE 1

Evaluation Results of Disk Media

| Medium No. | Note | Maximum projection height (nm) | Lower layer thickness/ maximum projection height | Media speed relative to head (m/sec) | Error rate $\times 10^{-1}$ initial | Error rate $\times 10^{-1}$ after running | Transfer speed (Mbps) |
|---|---|---|---|---|---|---|---|
| 1 | Comparative Example | 200 | 4.2 | 7 | 0.005 | 0.004 | 9.6 |
| 2 | Comparative Example | 200 | 4.2 | 13 | 0.002 | 0.09 | 16.8 |
| 3 | Comparative Example | 200 | 4.2 | 16 | 0.004 | 3 | 20.4 |
| 4 | Comparative Example | 200 | 4.2 | 20 | 0.005 | 35 | 25.2 |
| 5 | Example | 200 | 5.3 | 15 | 0.0008 | 0.002 | 19.2 |
| 6 | Example | 200 | 7.0 | 15 | 0.0008 | 0.007 | 19.2 |
| 7 | Example | 135 | 5.4 | 20 | 0.003 | 0.001 | 25.2 |
| 8 | Example | 135 | 6.2 | 20 | 0.005 | 0.004 | 25.2 |
| 9 | Comparative Example | 135 | 3.5 | 20 | 0.006 | 5 | 25.2 |
| 10 | Example | 52 | 9.8 | 20 | 0.003 | 0.002 | 25.2 |
| 11 | Example | 52 | 5.8 | 20 | 0.006 | 0.001 | 25.2 |
| 13 | Comparative Example | 52 | 4.3 | 20 | 0.008 | 1 | 25.2 |

Measurements

1) Maximum Projection Height

The maximum height of projections in the area of 750 mm² chosen arbitrarily from the support surface was measured with WYKOHD2000.

2) Non-magnetic Lower Layer Thickness

A disk sample was cut into a section by means of a microtome, and the thickness of its non-magnetic lower layer was measured with TEM.

3) Error Rate

Signals corresponding to 70 K bpi were recorded on each disk sample at a recording density of 5,200 tpi in a (1,7) RLL modulation mode, and error rates were measured at an initial stage of running and after 100 hours random running, respectively.

4) Transfer Speed

The time required to reproduce data of 200 Mbit was measured.

Evaluation Results

As can be seen from Table 1, the disk samples produced in Examples according to the invention showed slight increases in error rates under running at high transfer speeds. This performance of the present disk samples is an unprecedented feature.

A magnetic recording medium according to the invention causes a slight increase in error rate by running at a high transfer speed and has excellent durability.

This application is based on Japanese patent application JP 2000-343945, filed Nov. 10, 2000, the entire content of which is hereby incorporated by reference, the same as if set forth at length.

What is claimed is:

1. A floppy disk-shaped magnetic recording medium, which comprises:
   a non-magnetic support having projections on the surface thereof;
   a substantially non-magnetic lower layer including carbon black in an amount of less than 40 weight % of the substantially non-magnetic lower layer; and
   a magnetic layer containing a ferromagnetic powder dispersed in a binder, in this order, wherein:
   the non-magnetic lower layer and the magnetic layer are provided on each side of the non-magnetic support,
   the magnetic recording medium is configured and arranged for use under a condition that a velocity of the magnetic recording medium relative to a magnetic head is at least 14 m/sec and data can be read from the magnetic recording medium, and
   the non-magnetic lower layer has a thickness from five to twenty times as great as a maximum height of the projections on the surface of the non-magnetic support.

2. The magnetic recording medium according to claim 1, wherein the support is a film comprising polyester.

3. The magnetic recording medium according to claim 2, wherein the polyester is polyethylene terephthalate.

4. The magnetic recording medium according to claim 1, wherein the magnetic layer has a coercive force: Hc of at least 143.3 kA/m.

5. The magnetic recording medium according to claim 3, wherein the polyethylene terephthalate has a maximum projection height of 500 nm or below.

6. The magnetic recording medium according to claim 1, wherein the binder in the magnetic layer is used in an amount of 5 to 50 weight % based on the ferromagnetic powder.

7. The magnetic recording medium according to claim 1, wherein the lower layer has a thickness of 0.1 to 5 $\mu$m.

8. The magnetic recording medium according to claim 1, wherein the magnetic layer has a thickness of 0.02 to 0.5 $\mu$m.

* * * * *